(12) United States Patent
Huang et al.

(10) Patent No.: US 10,341,305 B2
(45) Date of Patent: Jul. 2, 2019

(54) ENCRYPTED COMMUNICATIONS METHOD AND COMMUNICATIONS TERMINAL, AND COMPUTER STORAGE MEDIUM

(71) Applicant: Sanechips Technology Co., Ltd., Shenzhen, Guangdong (CN)

(72) Inventors: Lei Huang, Shenzhen (CN); Xiaojie Zou, Shenzhen (CN); Zhiliang Zhang, Shenzhen (CN); Liangjun Tang, Shenzhen (CN); Wei Zhang, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 222 days.

(21) Appl. No.: 15/505,316

(22) PCT Filed: Nov. 17, 2014

(86) PCT No.: PCT/CN2014/091274
§ 371 (c)(1),
(2) Date: Feb. 21, 2017

(87) PCT Pub. No.: WO2015/117451
PCT Pub. Date: Aug. 13, 2015

(65) Prior Publication Data
US 2017/0272407 A1    Sep. 21, 2017

(30) Foreign Application Priority Data
Aug. 21, 2014    (CN) .......................... 2014 1 0416455

(51) Int. Cl.
*H04L 29/06*    (2006.01)
*H04W 12/02*    (2009.01)
(Continued)

(52) U.S. Cl.
CPC ............ *H04L 63/0428* (2013.01); *H04L 9/08* (2013.01); *H04L 63/205* (2013.01); *H04W 4/80* (2018.02);
(Continued)

(58) Field of Classification Search
CPC ..... H04L 63/0428; H04L 9/08; H04L 63/205; H04L 63/061; H04L 63/18; H04W 4/80; H04W 4/008; H04W 12/02; H04M 1/7253
See application file for complete search history.

(56) References Cited

U.S. PATENT DOCUMENTS 6,922,785 B1 *   7/2005   Brewer ............... H04L 63/0428
                                              380/28
8,254,835 B2     8/2012   Lee
(Continued)

FOREIGN PATENT DOCUMENTS

CN    103237305 A    8/2013
EP    1708405 A1    10/2006

OTHER PUBLICATIONS

Supplementary European Search Report in European application No. 14881505.3, dated Jul. 6, 2017, 5 pgs.
(Continued)

*Primary Examiner* — Shanto Abedin
(74) *Attorney, Agent, or Firm* — Ling Wu; Stephen Yang; Ling and Yang Intellectual Property

(57) ABSTRACT

Disclosed are an encrypted communications method and communications terminal. The method comprises: reading from a first NFC security label the encryption algorithm and the index of the encryption algorithm; using the encryption algorithm to encrypt a data packet to be transmitted so as to generate an encrypted data packet; transmitting the encrypted data packet; transmitting the index; the index is
(Continued)

configured so that the target communication terminal can obtain the encryption algorithm and decrypt the encrypted data packet. Also disclosed is a computer storage medium.

16 Claims, 7 Drawing Sheets

(51) Int. Cl.
  *H04L 9/08* (2006.01)
  *H04W 4/80* (2018.01)
(52) U.S. Cl.
  CPC ....... *H04W 12/02* (2013.01); *H04L 2209/805* (2013.01)

(56) References Cited

U.S. PATENT DOCUMENTS

| | | | |
|---|---|---|---|
| 8,290,872 B2 | 10/2012 | Ahn | |
| 2006/0224519 A1* | 10/2006 | Ahn | H04L 63/061 705/57 |
| 2012/0002810 A1 | 1/2012 | Imming | |
| 2012/0011572 A1* | 1/2012 | Chew | H04L 63/0853 726/4 |
| 2012/0033814 A1 | 2/2012 | Imming | |
| 2012/0129450 A1 | 5/2012 | Lee | |
| 2013/0117565 A1* | 5/2013 | He | H04L 63/061 713/168 |
| 2013/0205414 A1* | 8/2013 | Jussila | H04L 63/04 726/30 |
| 2014/0006798 A1* | 1/2014 | Prakash | G06F 21/6218 713/189 |
| 2014/0022060 A1* | 1/2014 | Boehler | H04L 63/0492 340/10.51 |
| 2014/0068261 A1* | 3/2014 | Malek | H04W 12/04 713/168 |
| 2016/0036594 A1* | 2/2016 | Conrad | H04L 9/3271 713/185 |

OTHER PUBLICATIONS

International Search Report in international application No. PCT/CN2014/091274, dated Jun. 3, 2015, 2 pgs.
English Translation of the Written Opinion of the International Search Authority in international application No. PCT/CN2014/091274, dated Jun. 3, 2015, 5 pgs.

* cited by examiner

ENCRYPTED COMMUNICATIONS METHOD AND COMMUNICATIONS TERMINAL, AND COMPUTER STORAGE MEDIUM

TECHNICAL FIELD

The disclosure relates to an encrypted communication technology in the field of communication, and in particular, to an encrypted communication method and communication terminal, and a computer storage medium.

BACKGROUND

At present, with the development of communication technology, whether in wire communication or wireless communication, people use various communication devices to perform information interaction and the communications between people become more frequently. So the problem to be solved in the traditional art is how to ensure the security of communication and prevent the content of communication from being stolen, so as to prevent the third party from obtaining and using personal privacy and other secret information illegally.

SUMMARY

In view of this, the disclosure is intended to provide an encrypted communication method and communication terminal, so as to improve the security of communication.

To this end, the technical solutions of the disclosure are implemented as follows.

The first aspect of the disclosure provides an encrypted communication method, which includes that: an encryption algorithm and an index of the encryption algorithm are read from a first Near Field Communication (NFC) security label card; a data packet to be transmitted is encrypted with the encryption algorithm, so as to generate an encrypted data packet; the encrypted data packet is sent; and the index is sent; wherein the index is used for a target communication terminal to obtain the encryption algorithm to decrypt the encrypted data packet.

Based on the above solution, the encrypted data packet may include an encrypted part and an unencrypted part; the index may be carried in the unencrypted part; the step that the index is sent may include that: the index is carried in the encrypted data packet, so as to be sent along with the data packet.

Based on the above solution, the method may further include that: an encryption label is added to the unencrypted part; wherein the encryption label may be arranged to indicate that the data packet where the label locates is the encrypted data packet.

Based on the above solution, the data packet to be transmitted may be a short message data packet; the short message data packet may be used for short message interaction.

Based on the above solution, the step that the index is sent may include that: the index is sent through a negotiation data packet; the negotiation data packet is a dada packet which is used by a source communication terminal to send the index to a target communication terminal.

Based on the above solution, when performing voice communication with the target communication terminal, the source communication terminal may send the negotiation data packet to the target communication terminal through a short message communication link or a voice communication link.

Based on the above solution, the data packet to be transmitted may be arranged as a voice data packet for voice communication; the step that the data packet to be transmitted may be encrypted with the encryption algorithm, so as to generate the encrypted data packet may include that: the voice data packet to be transmitted is encrypted with the encryption algorithm, so as to generate the encrypted data packet.

Based on the above solution, the encrypted data packet may include a packet header and a packet body; the unencrypted part may include the packet header; and the encrypted part may include the packet body.

The second aspect of the disclosure provides an encrypted communication method, which includes that: an index of an encryption algorithm is received; an encrypted data packet is received; a decryption algorithm is retrieved from a second NFC security label card according to the index; and the encrypted data packet is decrypted according to the decryption algorithm, so as to obtain the decrypted data packet.

Based on the above solution, the encrypted data packet may include the encrypted part and the unencrypted part; the index may be carried in the encrypted data packet, so as to be received along with the encrypted data packet.

Based on the above solution, the unencrypted part may also includes the encryption label; the method may further include that: the unencrypted part of the received data packet is parsed, so as to determine whether the encrypted data packet includes the encryption label; and when the encrypted data packet includes the encryption label, it is determined that the data packet is the encrypted data packet, and the step of retrieving the decryption algorithm from the second NFC security label card according to the index is performed.

Based on the above solution, the encrypted data packet may be generated for the short message data packet; the short message data packet may be used for short message interaction.

Based on the above solution, the step that the index of the encryption algorithm is received may include that: the negotiation data packet is received; wherein the negotiation data packet may be a data packet for the source communication terminal to send the index to the target communication terminal.

Based on the above solution, when the source communication terminal performs voice communication with the target communication terminal, the step that the negotiation data packet is received may include that: the negotiation data packet is received from the short message communication link or the voice communication link.

Based on the above solution, the encrypted data packet may be generated by encrypting the voice data packet; the voice data packet may be used for voice communication.

Based on the above solution, the encrypted data packet may include the packet header and the packet body; the unencrypted part may include the packet header; and the encrypted part may include the packet body.

The third aspect of the disclosure provides a source communication terminal. The terminal includes: a reading unit, which is arranged to read the encryption algorithm and the index of the encryption algorithm from the first NFC security label card; an encrypting unit, which is arranged to encrypt the data packet to be transmitted with the encryption algorithm, so as to generate the encrypted data packet; a sending unit, which is arranged to send the encrypted data packet; and the sending unit is further arranged to send the index; wherein the index is used for the target communication terminal to obtain the encryption algorithm, so as to decrypt the encrypted data packet.

Based on the above solution, the encrypted data packet may include the encrypted part and the unencrypted part; the index may be carried in the unencrypted part; the sending unit may be arranged to carry the index in the encrypted data packet, so as to send the index along with the data packet.

Based on the above solution, the terminal further may include: an adding unit, which may be arranged to add the encryption label to the unencrypted part; wherein the encryption label may be arranged to indicate that the data packet where the label locates is the encrypted data packet.

Based on the above solution, the data packet to be transmitted may be a short message data packet; the short message data packet may be used for short message interaction; the encrypting unit may be arranged to encrypt the short message data packet to be transmitted with the encryption algorithm, so as to generate the encrypted data packet.

Based on the above solution, the sending unit may be arranged to send the index through the negotiation data packet; the negotiation data packet may be a data packet for the source communication terminal to send the index to the target communication terminal.

Based on the above solution, the sending unit may be arranged to send, when the source communication terminal performs voice communication with the target communication terminal, the negotiation data packet to the target communication terminal through the short message communication link or the voice communication link.

Based on the above solution, the data packet to be transmitted may be a voice data packet used for voice communication; the encrypting unit may be specifically arranged to encrypt the voice data packet to be transmitted with the encryption algorithm, so as to generate the encrypted data packet.

Based on the above solution, the encrypted data packet may include the packet header and the packet body; the unencrypted part may include the packet header; and the encrypted part includes the packet body.

The fourth aspect of the disclosure provides a target communication terminal, which includes: a receiving unit, which is arranged to receive an index of an encryption algorithm; the receiving unit is further arranged to receive an encrypted data packet; a retrieving unit, which is arranged to retrieve an decryption algorithm from the second NFC security label card according to the index; and a decrypting unit, which is arranged to decrypt the encrypted data packet according to the decryption algorithm, so as to obtain the unencrypted data packet.

Based on the above solution, the encrypted data packet may include the encrypted part and the unencrypted part; the receiving unit may be arranged to receive the index carried in the encrypted data packet along with the encrypted data packet.

Based on the above solution, the unencrypted part may also include the encryption label; the terminal may further includes: a parsing unit, which may be arranged to parse the unencrypted part of the received data packet, so as to determine whether the encrypted data packet includes the encryption label; a determining unit, which may be arranged to determine, when the encrypted data packet includes the encryption label, that the data packet may be the encrypted data packet; and the retrieving unit, which may be arranged to retrieve, when it is determined that the received data packet is the encrypted data packet, the decryption algorithm from the second NFC security label card according to the index.

Based on the above solution, the encrypted data packet may be generated for a short message data packet; the short message data packet may be used for short message interaction; the decrypting unit may be arranged to decrypt the encrypted data packet according to the decryption algorithm, so as to obtain the unencrypted short message data packet.

Based on the above solution, the receiving unit may be arranged to receive a negotiation data packet; wherein the negotiation data packet may be a data packet for the source communication terminal to send the index to the target communication terminal.

Based on the above solution, the receiving unit may be arranged to receive, when the source communication terminal performs voice communication with the target communication terminal, the negotiation data packet from the short message communication link or the voice communication link.

Based on the above solution, the encrypted data packet may be generated by encrypting a voice data packet; the voice data packet may be used for voice communication; the decrypting unit may be arranged to decrypt the encrypted data packet according to the decryption algorithm, so as to obtain the unencrypted voice data packet.

Based on the above solution, the encrypted data packet may include the packet header and the packet body; the unencrypted part may include the packet header; and the encrypted part may include the packet body.

The fifth aspect of the disclosure provides a computer storage medium having stored therein computer executable instructions for performing at least one of the methods described in the first aspect and the second aspect of the disclosure.

According to the encrypted communication method and communication terminal of the disclosure, before a data packet is sent, an encryption algorithm and an index of the encryption algorithm are read from an NFC security label card, then the data packet to be transmitted is encrypted, and the encrypted data packet is transmitted. In such a manner, the security of information is improved.

DETAILED DESCRIPTION

The technical solutions in embodiments of the disclosure are clearly and completely described below in combination with the accompanying drawings.

Embodiment 1

Figure 1:
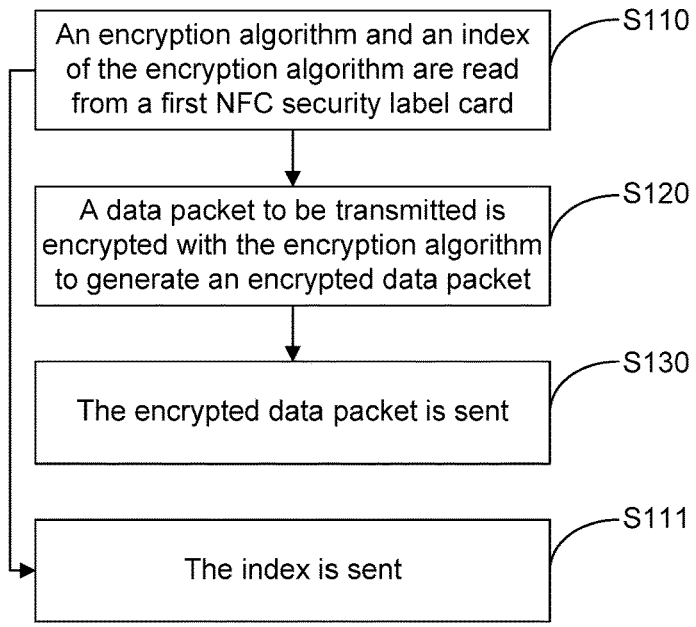
FIG. 1 is flowchart 1 of an encrypted communication method according to an example of the disclosure.

As shown in FIG. 1, the present embodiment provides an encrypted communication method, which includes the following steps.

In step S110, an encryption algorithm and an index of the encryption algorithm are read from a first NFC security label card.

In step S120, a data packet to be transmitted is encrypted with the encryption algorithm, so as to generate an encrypted data packet.

In step S130, the encrypted data packet is sent.

In step S111, the index is sent.

The index is used for a target communication terminal to obtain the encryption algorithm, so as to decrypt the encrypted data packet.

The steps S110 to S130 are performed in sequence, and the step S111 is performed after the step S110.

The NFC is an abbreviation of Near Field Communication, referring to the short range wireless communication technology. In the present embodiment, the encryption algorithm and the index of the encryption algorithm are read from the first NFC security label card. One or more encryption algorithms and the index of each encryption algorithm are stored in the first NFC security label card. The index may be the serial number and name of the encryption algorithm and other identifying information, and may be used for retrieving the encryption algorithm. The encryption algorithm may be a symmetric encryption algorithm, an asymmetric encryption algorithm, a digest encryption algorithm, and so on.

When there are a plurality of encryption algorithms stored in the first NFC security label card, in the step S110 of reading the encryption algorithm and the index of the encryption algorithm, at least one encryption algorithm and the index of the encryption algorithm are selected from the plurality of encryption algorithms.

The encryption levels of the encryption algorithms in the first NFC security label may be different. For example, the difficulty of decrypting the data which is encrypted by using the asymmetric encryption algorithm is usually higher than the difficulty of decrypting the data which is encrypted by using the symmetric encryption algorithm. Then, the encryption level of the asymmetric encryption algorithm can be set higher than the encryption level of the symmetric encryption algorithm.

During the specific implementation, the method further includes that: a user instruction is received, and then the encryption algorithm is selected based on the user instruction. For example, if the user instruction includes the encryption level, the encryption algorithm corresponding to the encryption level and its index are read from the first NFC security label card according to the encryption level. For another example, if the user instruction includes communication importance sign information, the corresponding encryption algorithm is selected from the first NFC security label card according to the map relation between the sign information and the encryption level. For another example, if the user instruction includes the number of encryptions n with one encryption at least corresponding to one encryption algorithm, then n encryption algorithms and the indexes of the n encryption algorithms are read from the first NFC security label card according to the number of encryptions n, wherein the n is an integer not less than 1.

Particularly, how to read the encryption algorithm and its corresponding index from the first NFC security label card requires the source communication terminal to support the NFC technology, so that the encryption algorithm can be directly read from the first NFC security label card which is separated from or integrated with the source communication terminal.

In the present embodiment, preferably, the first NFC security label card is separated from the source communication terminal, which is convenient for the user to save the source communication terminal and the first NFC security label card separately, thereby reducing the probability that the source communication terminal and the first NFC security label card are lost at the same time, and then reducing the probability that an illegal user can decrypt encrypted information of the user because of obtaining the source communication terminal and the first NFC security label card at the same time. In such a manner, the information security is improved.

In addition to the above way, there are several ways about how to read the encryption algorithm and the index of the encryption algorithm in the step S110, which will not be described here.

In the step S120, the data packet to be transmitted is encrypted according to the encryption algorithm read in the step S110, so as to generate the encrypted data packet. The encrypted data packet can a data packet which is encrypted completely or partly.

If the data packet to be transmitted is not encrypted during the communication, the third party may intercept the data packet to directly extract communication contents, thereby causing the personal privacy, commercial secret or technology secret in the data packet to be stolen or abused, and causing information security incidents.

In the present embodiment, the data packet is encrypted, so even if the third party intercepts the encrypted data packet, it is difficult to obtain the communication contents if the encrypted data packet cannot be decrypted. Thereby the difficulty that the third party obtains the communication contents is enhanced, and the information security of communication is improved.

In the present embodiment, for the convenience of the target communication terminal to decrypt, the step S111 of sending the index of the encryption algorithm is also included, so that the target communication terminal may obtain the corresponding decryption algorithm according to the index, extract the communication contents, and realize the normal communication.

The encrypted data packet includes an encrypted part and an unencrypted part. The index is carried in the unencrypted part. Sending the index includes that: the index is carried in the encrypted data packet, so as to be sent along with the data packet.

That is, the steps S130 and S111 are performed in the same step, and the source communication terminal needs to perform only one sending operation. Thus, the number of times of sending the data packet by the source communication terminal can be reduced, and the power consumption of the communication terminals can be reduced, especially when the source communication terminal and the target communication terminal are mobile communication terminals.

In the present embodiment, the encrypted data packet is partly encrypted. Partly encrypting can reduce the amount of data to be encrypted. At the same time, even if an illegal user intercepts the data packet, he cannot obtain the complete content of the communication data packet, so the encryption effect can also be achieved.

The partly encrypting may be to encrypt the specified data content in the data packet. For example, an encryption policy storing several encryption keywords is pre-set in the source communication terminal, and encrypting is performed according to the keywords. For example, when the current transmitted information includes a keyword bank card, if the source communication terminal finds that the data packet to be transmitted has the corresponding word, it encrypts the specified number of characters around the word. For example, 20 characters around the word bank card in the data packet to be transmitted are encrypted; or the numeric characters following the word bank card are encrypted.

For another example, the data packet usually includes a packet header and a packet body. The packet header stores attribute information of the packet and the packet body stores communication contents. Usually, the packet header also includes a file format of the encrypted information, such as a text format, a voice format or a video format. If an electronic device cannot learn the file format, it cannot read the file. It is feasible to encrypt only the part for recording the file format in the packet header. Of course, this encrypting method is applicable to communications with attachments.

Figure 2:
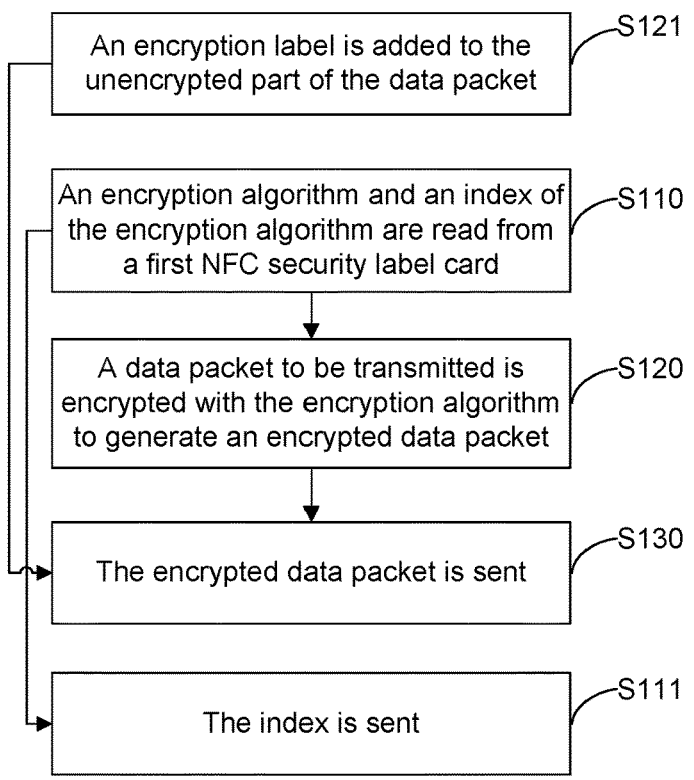
FIG. 2 is flowchart 2 of an encrypted communication method according to an example of the disclosure.

Based on the above solution, as shown in FIG. 2, the method further includes a step S121. In the step S121, an encryption label is added to the unencrypted part. The encryption label is to indicate the data packet where the label locates is the encrypted data packet.

In the present embodiment, through the encryption label, it is convenient for the target communication terminal to confirm whether the data packet is the encrypted data packet and whether to perform actions of obtaining a decryption algorithm and decrypting the data packet. The encryption label may correspond to one or more bits of the unencrypted part in the encrypted data packet, particularly a byte. Usually, the encryption label locates at a specified location in the data packet, so that the target communication terminal extracts the field from the corresponding position to check when receiving a data packet each time, so as to confirm whether the data packet is the encrypted data packet.

The data packet to be transmitted is a short message data packet which is used for short message interaction. In the step S120, the short message data packet to be transmitted is encrypted with the encryption algorithm, so as to generate the encrypted data packet.

In the present embodiment, it is defined that the data packet to be transmitted is the short message data packet. It is when short message (known as SMS) interaction between the communication terminal of the user and the target communication terminal is performed that the short message is encrypted. In the specific implementation, the data packet to be transmitted may also be a voice data packet for voice communication or a data packet for instant messaging.

In the present embodiment, compared with carrying the index in the unencrypted part of the encrypted data packet, in order to further enhance the encryption effect, sending the index may also be: sending the index through a negotiation data packet. The negotiation data packet is a data packet for the source communication terminal to send the index to the target communication terminal. In such a manner, the index and the communication content are in different data packets, and the third party cannot obtain both the index of the encryption algorithm and the communication content by intercepting only one data packet, so the encryption security is improved again.

In the specific implementation, the negotiation data packet may be sent before or after the encrypted data packet is sent. In the present embodiment, preferably, the negotiation data packet is sent before the encrypted data packet is sent. So the target communication terminal receives the index before or while receiving the encrypted data packet, and decrypts the encrypted data packet quickly.

When the source communication terminal performs voice communication with the target communication terminal, the negotiation data packet is sent to the target communication terminal through a short message communication link or a voice communication link.

The short message communication link is a communication link for transmitting a short message, and the voice communication link is a communication link for performing the voice communication. When the voice communication is performed, the source communication terminal and the target communication terminal will perform communication negotiations, for example, by a three-way handshake. The information exchanged in these negotiations may also include the negotiation data packet carrying the index. In such a manner, the negotiation data packet is not sent through the short message link, which simplifies the interaction between the electronic devices and reduces communication cost.

The data packet to be transmitted is a voice data packet for voice communication. Particularly, the step S130 may include encrypting the voice data packet to be transmitted with the encryption algorithm to generate the encrypted data packet.

In the present embodiment, it is emphasized to use the negotiation data packet to send the index of the encryption algorithm when the source communication terminal performs voice communication with the target communication terminal, because the voice communication usually lasts for a period of time, and a plurality of voice data packets are generated continuously. Preferably, one voice communication employs one encryption mode to encrypt, and all voice data packets generated in this voice communication are encrypted by the same way, so it is only needed to transmit the index of the encryption algorithm once, and not each data packet carries the index. In such a manner, the security can be improved.

In the specific implementation, the short message interaction certainly can adopt this method too.

In addition, for the encrypted data packet generated by encrypting the voice data packet, the encrypted data packet may also be the partly encrypted data packet, and the unencrypted part may also carry the encryption label to facilitate the target communication terminal to determine whether to decrypt.

However, if the source communication terminal A sends the negotiation data packet to the target communication terminal before performing information interaction with the target communication terminal, that is, the source communication terminal A indicates to the target communication terminal that all the data packets subsequently received are the encrypted data packets, then the target communication terminal may determine, according to the sending address of the data packet, that the data packet is from the source communication terminal A, and this communication is encrypted communication. So, after the data packet is received, the steps related to decryption may be directly performed without determination.

In the specific implementation, if the duration of the voice communication between the source communication terminal and the target communication terminal is longer than a specified duration, then the source communication terminal will send the negotiation data packet to the target communication terminal again, and encrypt the voice data packet to be transmitted by different ways, thereby enhancing the encryption effect again.

For example, it is supposed that a teleconference is currently taken between the user A of the source communication terminal and the user B of the target communication terminal, the contents of communication are very important, and the conversation lasts for one hour. During this hour, when the third party intercepts each data packet and decrypt it by adopting the information decryption technology, if it decrypts a data packet successfully, then all the data packets in the one hour-long communication are decrypted. If the encryption way is changed and the negotiation data packet is sent every 10 minutes, then the data packets sent in one hour are encrypted by six encryption ways. The security of information is improved obviously.

When a plurality of data packets generated in a communication process are encrypted by at least two encryption ways, in addition to the index, the negotiation data packet may also include identifier information of the first data packet which is decrypted according to the index. In a radio communication process, the identifier information may be the number of a radio frame or the number of the data packet.

Furthermore, in the present embodiment, it is further defined that the encrypted data packet includes the packet header and the packet body. The unencrypted part includes the packet header, and the encrypted part includes the packet body. The packet body is the content interacted between two parties, and at least a part of the packet body is one of objects to be encrypted. Most of the data stored in the packet header is some attribute information of the data packet, and obtaining information of the packet header will not directly influence secret spilling of the communication content, so the packet header may be unencrypted part. In such a manner, it is convenient for the target communication terminal to directly parse the packet header and perform the corresponding processing, which simplifies the operations of the target communication terminal.

To sum up, the present embodiment provides an encrypted communication method, which can improve the communication security effectively.

Embodiment 2

Figure 3:
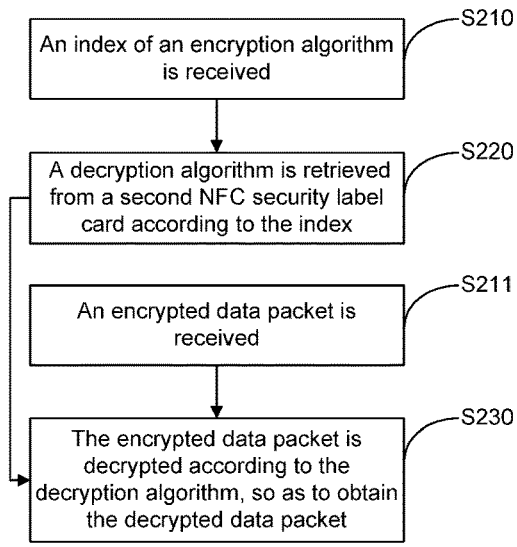
FIG. 3 is flowchart 3 of an encrypted communication method according to an example of the disclosure.

As shown in FIG. 3, the present embodiment provides an encrypted communication method, which includes the following steps.

In step S210, an index of an encryption algorithm is received.

In step S211, an encrypted data packet is received.

In step S220, a decryption algorithm is retrieved from a second NFC security label card according to the index.

In step S230, the encrypted data packet is decrypted according to the decryption algorithm, so as to obtain the decrypted data packet.

In the specific implementation, the encryption algorithm and the decryption algorithm correspond to each other. Usually, if a symmetrical encryption is used, the key of the encryption algorithm is the same as the key of the decryption algorithm, and the index of the encryption algorithm is the same the key of the decryption algorithm. If an asymmetrical encryption algorithm is used, the key for encryption is different from the key for decryption, but they are paired in advance. If the index of the encryption algorithm is known, then the index of the corresponding decryption algorithm can be known, and the key of the decryption algorithm can be found.

The executing body in the embodiment 1 is the source communication terminal, but in the present embodiment, the executing body is the target communication terminal. The source communication terminal and the target communication terminal form the two parties of communication. The condition that the first NFC security label card and the second NFC security label card need to satisfy is: the corresponding decryption algorithm can be found in the second NFC security label card according to the index provided by the first NFC security label card. Specifically, the contents stored in the first NFC security label card and the second NFC security label card are completely identical, and can support decryption and encryption at the same time; or parts of the contents stored in the first NFC security label card and the second NFC security label card are the same, but the same part can support mutual decryption and encryption. For example, there are 10 encryption algorithms and corresponding indexes stored in the first NFC security label card, and there are 20 encryption algorithms and corresponding indexes stored in the second NFC security label card. The 20 encryption algorithms and corresponding indexes stored in the second NFC security label card include the encryption algorithms and corresponding indexes stored in the first NFC security label card. So when the data packet to be transmitted is encrypted by randomly using an encryption algorithm in the first NFC security label card to generate the encrypted data packet, the second NFC security label card can decrypt the encrypted data packet.

In the specific implementation, the first NFC security label card stores a number of encryption algorithms and indexes, and the second NFC security label card stores the decryption algorithms and indexes of the encryption algorithms which are stored in the first NFC security label card. For example, in an asymmetrical encryption process, the first NFC security label card can only store the encryption algorithm and index, and the second NFC security label card can only store the decryption algorithm and index. After the encryption algorithm in the first NFC security label card is used for encrypting, it is necessary to retrieve the decryption algorithm from the second NFC security label card to decrypt.

The present embodiment provides, from the target communication terminal, an encrypted communication method corresponding to the embodiment 1, which improves the communication security.

Based on the above solution, the encrypted data packet includes the encrypted part and the unencrypted part. The index is carried in the encrypted data packet, so as to be received along with the encrypted data packet.

The steps S211 and S210 in FIG. 3 are performed at the same time. When the encrypted data packet is received, the index of the encryption algorithm is received at the same time.

Any encryption method in the traditional art may be employed to encrypt the part to be encrypted, so as to partly encrypt the data. As to which data is encrypted, the corresponding part in the embodiment 1 may be referred to.

The unencrypted part also includes an encryption label. The method of the present embodiment further includes that: the unencrypted part of the received data packet is parsed, so as to determine whether the encrypted data packet includes the encryption label; and when the encrypted data packet includes the encryption label, it is determined that the data packet is the encrypted data packet. if so, the step of retrieving the decryption algorithm from the NFC security label card according to the index is performed.

In the present embodiment, the received encrypted data packet also includes the encryption label. The target communication terminal may determine whether the data packet received by it is the encrypted data packet by extracting and parsing whether the received data packet includes the encryption label, and then determine whether it is needed to decrypt the data packet. In the specific implementation, if the index is carried in the encrypted data packet, after it is determined according to the encryption label that the data packet is the encrypted data packet, the step of extracting and parsing the index of the encryption algorithm is performed, and the step of retrieving the decryption algorithm is then performed. The encrypted data packet is then decrypted.

Furthermore, the encrypted data packet is generated for the short message data packet. The short message data packet is used for short message interaction. Specifically, the step S230 may include: the encrypted data packet is decrypted according to the decryption algorithm, so as to obtain the decrypted short message data packet. Obviously, the encrypted data packet in the present embodiment is not limited to the encrypted short message data packet, but also includes the encrypted voice data packet. The encrypted data packet can also include the encrypted data packet generated by encrypting the instant messaging. The corresponding part in the embodiment 1 may be referred to for details.

In addition to carrying the index in the encrypted data packet so as to receive the index of the encryption algorithm along with the encrypted data packet, the present embodiment also provides another method for receiving the index of the encryption algorithm as follows.

Receiving the index of the encryption algorithm includes receiving the negotiation data packet; wherein the negotiation data packet is a data packet for the source communication terminal to send the index to the target communication terminal.

The security of communication may be improved again by separately receiving the index of the encryption algorithm through the negotiation data packet.

When the source communication terminal performs voice communication with the target communication terminal, receiving the negotiation data packet includes that: the negotiation data packet is received from the short message communication link or the voice communication link.

If the negotiation data packet is transmitted through the short message link, the negotiation data packet is transmitted from the short message communication link. When the source communication terminal performs voice communication with the target communication terminal, a special voice communication link is opened. Then, the negotiation data packet can be carried in the voice communication link to send. After the voice communication link is established, negotiation processing is performed before the user performs voice communication, and the negotiation data packet can be transmitted in the negotiation processing.

Furthermore, the encrypted data packet is generated by encrypting the voice data packet for voice communication. Specifically, S230 may include: the encrypted data packet is decrypted according to the decryption algorithm, so as to obtain the decrypted voice data packet.

Based on the above solution, the encrypted data packet includes the packet header and the packet body. The unencrypted part includes the packet header; and the encrypted part includes the packet body.

The present embodiment is the encrypted communication method presented from the target communication terminal corresponding to the embodiment 1, and its corresponding beneficial effects can be found in the corresponding part in the embodiment 1. Obviously, the method improves the security of communication.

Embodiment 3

Figure 4:
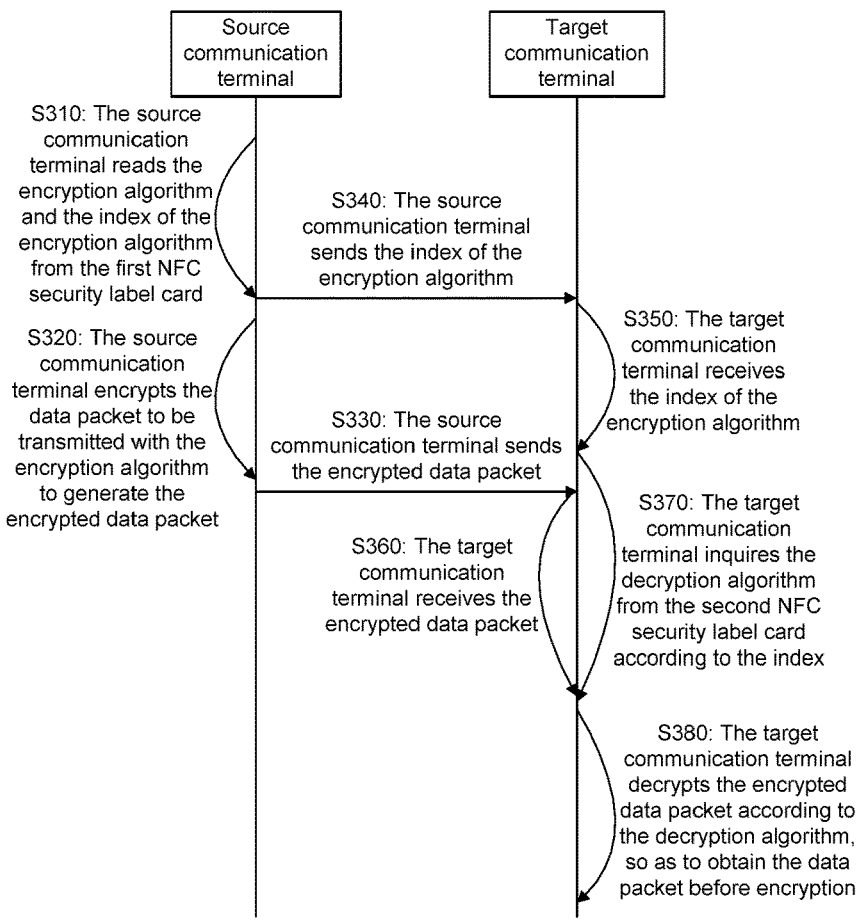
FIG. 4 is flowchart 4 of an encrypted communication method according to an example of the disclosure.

As shown in FIG. 4, the present embodiment provides an encrypted communication method, which includes the following steps.

In step S310, the source communication terminal reads the encryption algorithm and the index of the encryption algorithm from the first NFC security label card.

In step S320, the source communication terminal uses the encryption algorithm to encrypt the data packet to be transmitted, so as to generate the encrypted data packet.

In step S330, the source communication terminal sends the encrypted data packet.

In step S340, the source communication terminal sends the index.

In step S350, the target communication terminal receives the index of the encryption algorithm.

In step S360, the target communication terminal receives the encrypted data packet.

In step S370, the target communication terminal retrieves the decryption algorithm from the second NFC security label card according to the index.

In step S380, the target communication terminal decrypts the encrypted data packet according to the decryption algorithm, so as to obtain the decrypted data packet.

The operations performed by the source communication terminal can be found in the embodiment 1. The operations performed by the target communication terminal can be found in the embodiment 2. The present embodiment describes how the source communication terminal and the target communication terminal perform information interaction. In the specific implementation, the index of the encryption algorithm can be carried either in the encrypted data packet to send or in the negotiation data packet to send separately.

As the methods of the embodiment 1 and/or the embodiment 2, the communication method of the present embodiment has the advantage of high security of communication.

Embodiment 4

Figure 5:
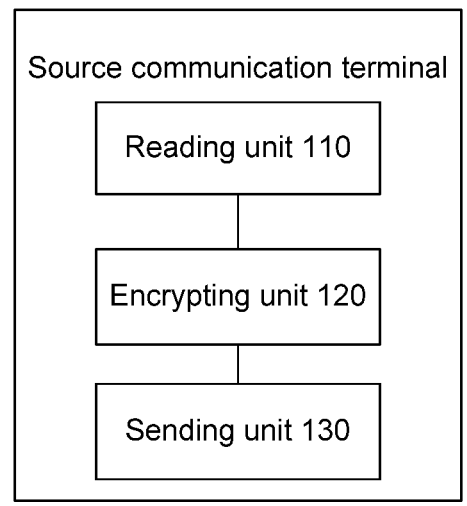
FIG. 5 is a structure diagram of a source communication terminal according to an example of the disclosure.

As shown in FIG. 5, the present embodiment provides a source communication terminal, which includes: a reading unit 110, which is arranged to read an encryption algorithm and the index of the encryption algorithm from the first NFC security label card;

an encrypting unit 120, which is arranged to encrypt a data packet to be transmitted with the encryption algorithm to generate the encrypted data packet; a sending unit 130, which is arranged to send the encrypted data packet; the sending unit 130 is further arranged to send the index; wherein the index is used by a target communication terminal to obtain the encryption algorithm to decrypt the encrypted data packet.

The specific structure of the reading unit 110 in the present embodiment may include a communication interface of NFC. The encryption algorithm and its index in the first NFC security label card may be read through the reading unit.

The specific structure of the encrypting unit 120 may include a processor and a storage medium which are connected through buses (including a data bus and an address bus). The storage medium stores computer executable codes and the processor encrypts the data to be transmitted by reading and executing the executable codes and the encryption algorithm.

The processor may be a central processing unit, a microprocessor, a digital signal processor or a programmable logic array, and other electronic components with processing functions.

The specific structure of the sending unit may include a communication interface, such as a sending antenna or a transmission cable.

Based on the above solution, the encrypted data packet includes the encrypted part and the unencrypted part and the index is carried in the unencrypted part. The sending unit 130 is arranged to carry the index in the encrypted data packet, so as to send the index along with the data packet. So, the sending unit 130 may send the communication content and the index of the encryption algorithm in one shot, which reduces the number of times of sending the data.

The terminal further includes an adding unit, which is arranged to add an encryption label to the unencrypted part. The encryption label is used to indicate that the data packet where the label locates is the encrypted data packet.

The terminal in the present embodiment further includes the adding unit which is arranged to add the encryption label to the unencrypted part of the encrypted data packet. The target communication terminal is informed whether the data received by it is the encrypted data packet by addition of the encryption label.

The specific structure of the adding unit may also include a processor and a storage medium connected with the processor. In the specific implementation, the adding unit and the encrypting unit 120 may be integrated to correspond to the same processor or correspond to different processors respectively. When they are integrated to correspond to the same processor, the processor may perform the functions corresponding to the encrypting unit 120 and the adding unit by time division multiplexing or thread concurrency.

Based on the above solution, when the data packet to be transmitted is a short message data packet, the encrypting unit 120 is arranged to encrypt the short message data packet to be transmitted with the encryption algorithm to generate the encrypted data packet. The short message data packet is used for short message interaction.

The sending unit 130 is arranged to send the index through a negotiation data packet which is a data packet for the source communication terminal to send the index to the target communication terminal.

The sending unit 130 is arranged to send, when the source communication terminal performs voice communication with the target communication terminal, the negotiation data packet to the target communication terminal through a short message communication link or a voice communication link, which can save the communication cost while simplifying the interaction of the data packet.

When the data packet to be transmitted is a voice data packet for voice communication, the encrypting unit 120 is arranged to encrypt the voice data packet to be transmitted with the encryption algorithm to generate the encrypted data packet.

The encrypted data packet includes the packet header and the packet body. The unencrypted part includes the packet header and the encrypted part includes the packet body.

The source communication terminal in the present embodiment is used for providing hardware support for the method in the embodiment 1, and can be used for implementing any technical solution in the embodiment 1, and also has the advantage of high security of information. The source communication terminal in the present embodiment may be a mobile phone and a tablet computer. The first NFC security label card can be a component integrated in or separated from the source communication terminal. The NFC security label card at least includes a storage medium for storing the encryption algorithms and indexes.

Embodiment 5

Figure 6:
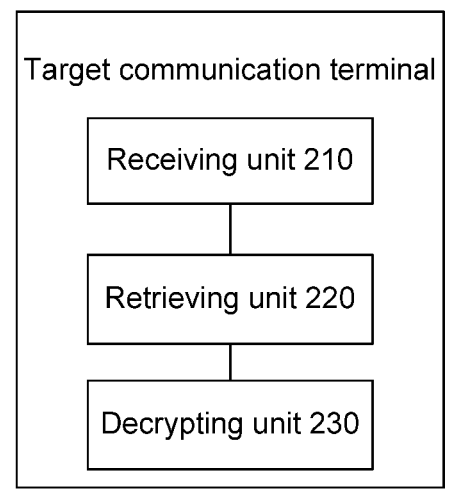
FIG. 6 is structure diagram 1 of a target communication terminal according to an example of the disclosure.
Figure 7:
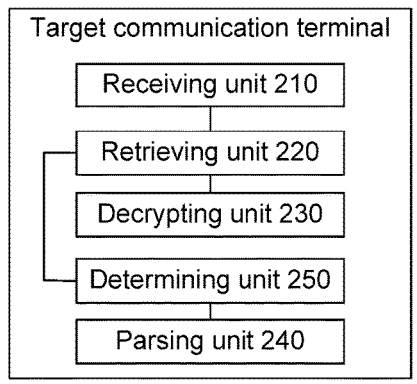
FIG. 7 is structure diagram 2 of a target communication terminal according to an example of the disclosure.

As shown in FIG. 6, the present embodiment provides a target communication terminal, which includes: a receiving unit 210, which is arranged to receive an index of an encryption algorithm, the receiving unit is further arranged to receive the encrypted data packet; a retrieving unit 220, which is arranged to retrieve a decryption algorithm from the second NFC security label card according to the index; and a decrypting unit 230, which is arranged to decrypt the encrypted data packet according to the decryption algorithm, so as to obtain the decrypted data packet.

The specific structure of the receiving unit 210 can be a receiving antenna or a communication interface capable of receive information, such as a twisted pair interface or an optical fibre communication interface. The specific structures of the retrieving unit 220 and the decrypting unit 230 can both include a processor and a storage medium which are connected through a bus (including a data bus and an address bus). The storage medium stores computer executable codes. The processor retrieves the decryption algorithm and decrypts the encrypted data packet by reading and executing the executable codes.

After receiving the encrypted data packet, the target communication terminal of the present embodiment retrieves the decryption algorithm from the second NFC security label card, and decrypts the encrypted data packet according to the retrieved decryption algorithm, so as to obtain the communication content.

The target communication terminal can be an electronic device with communication function, such as a mobile phone or a tablet computer. The second NFC security label card can be integrated in or separated from the target communication terminal. In the present embodiment, preferably, the second NFC security label card is separated from the electronic device. If the encrypted data packet is encrypted by using the first encryption algorithm, the decryption algorithm and its index corresponding to the first encryption algorithm is stored in the second NFC security label card.

Based on the above solution, the encrypted data packet includes the encrypted part and the unencrypted part. The receiving unit 210 is arranged to receive the index carried in the encrypted data packet along with the encrypted data packet.

The unencrypted part also includes an encryption label. As shown in FIG. 6, the terminal further includes: a parsing unit 240, which is arranged to parse the unencrypted part of the received data packet, so as to determine whether the encrypted data packet includes the encryption label; a determining unit 250, which is arranged to determine, when the encrypted data packet includes the encryption label, that the data packet is the encrypted data packet; and the retrieving unit 220, which is specifically arranged to retrieve, when it is determined that the received data packet is the encrypted data packet, the decryption algorithm from the second NFC security label card according to the index.

The terminal in the present embodiment is added with the parsing unit 240 and the determining unit 250. The specific structure of the parsing unit can be a decoder which decodes the unencrypted part of the encrypted data packet. The parsing unit may also include a processor which is arranged to analyse the decoding result output by the decoder, and then determine whether the encrypted data packet includes the encryption label. The specific structure of the determining unit 250 is the same processor.

When the encrypted data packet is generated by encrypting a short message data packet, the decrypting unit 230 is arranged to decrypt the encrypted data packet according to the decryption algorithm, so as to obtain the decrypted short message data packet. The short message data packet is used for short message interaction.

Furthermore, the receiving unit 210 is specifically arranged to receive a negotiation data packet which is a data packet for the source communication terminal to send the index to the target communication terminal.

The receiving unit is arranged to receive, when the source communication terminal performs voice communication with the target communication terminal, the negotiation data packet from a short message communication link or a voice communication link.

Because the voice communication link is opened to send the voice data packet when the voice communication is performed, obviously the voice communication link can also be used for receiving the negotiation data packet, or the negotiation data packet is received through the short message communication link. When the voice communication link is selected for receiving the negotiation data packet, the interaction between the two parties of communication can be simplified, and the communication cost can be reduced.

When the encrypted data packet is generated by encrypting the voice data packet, the decrypting unit 230 is arranged to decrypt the encrypted data packet according to the decryption algorithm, so as to obtain the decrypted voice data packet; wherein the voice data packet is used for voice communication.

The encrypted data packet includes a packet header and a packet body. The unencrypted part includes the packet header, and the encrypted part includes the packet body.

To sum up, the present embodiment provides a communication terminal which provides hardware support for the encrypted communication method in the embodiment 2, can be used for implementing any technical solution in the embodiment 2, and also has the advantage of high security of communication.

Embodiment 6

Figure 8:
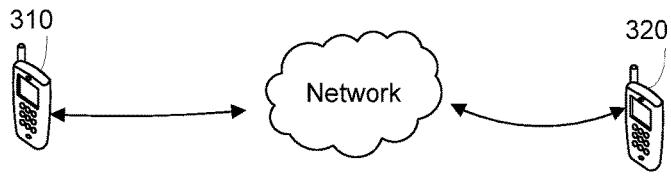
FIG. 8 is a structure diagram of a communication system according to an embodiment of the disclosure.

As shown in FIG. 8, the present embodiment provides a communication system, which includes a source communication terminal 310 and a target communication terminal 320.

The source communication terminal 310 is arranged to read an encryption algorithm and an index of the encryption algorithm from the first NFC security label card, encrypt a data packet to be transmitted with the encryption algorithm, so as to generate the encrypted data packet, and send the encrypted data packet and the index.

The target communication terminal 320 is arranged to receive the index of the encryption algorithm, receive the encrypted data packet, retrieve the decryption algorithm from the second NFC security label card according to the index, and decrypt the encrypted data packet according to the decryption algorithm, so as to obtain the decrypted data packet.

The source communication terminal 310 and the target communication terminal 320 are connected through a network. The network may be a wired network or a wireless network or a hybrid network of wired network and wireless network. The source communication terminal and the target communication terminal provide a hardware structure for the encrypted communication of the embodiment 3. Similarly, by using the communication system of the present embodiment to communicate, security of communication is high.

Several specific examples are provided below in combination with any above embodiment.

Example 1

Figure 9:
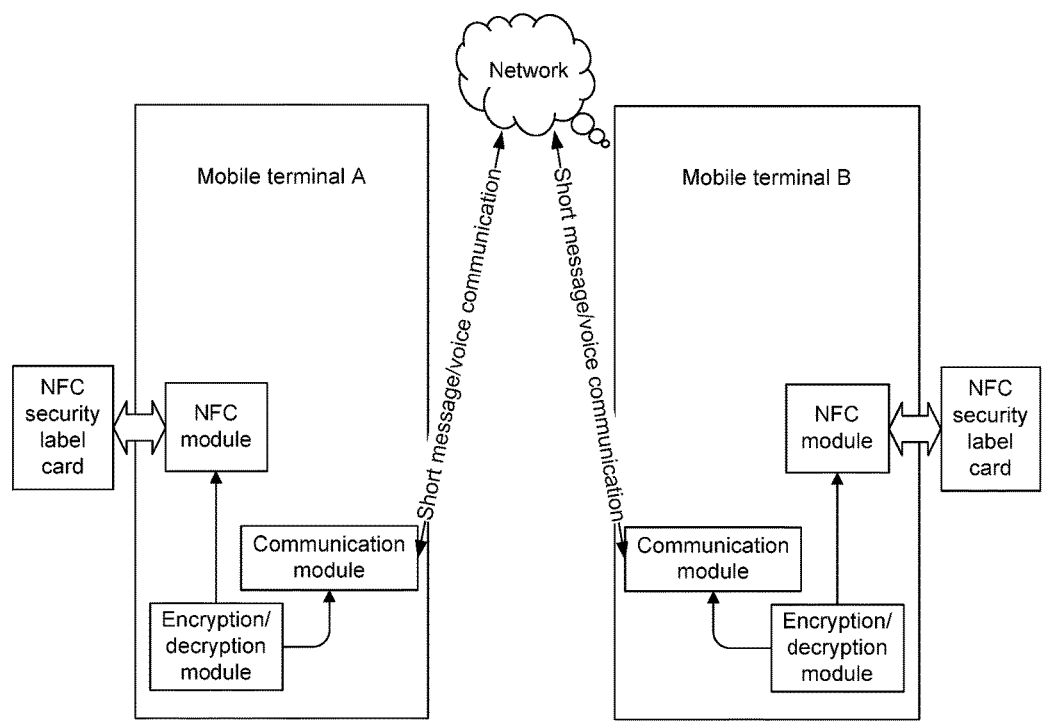
FIG. 9 is a structure diagram of a communication according to an example of the disclosure.

As shown in FIG. 9, the present example provides a communication system, which includes a mobile communication terminal A and a mobile communication terminal B. One of the mobile communication terminal A and the mobile communication terminal B is the source communication terminal, and the other is the target communication terminal. The mobile communication terminal A and the mobile communication terminal B can perform short message and voice communications through the network.

Each mobile communication terminal includes the following modules:

an NFC module, which is arranged to read an encryption algorithm and the index of the encryption algorithm from the NFC security label card, or retrieve the decryption algorithm according to the index of the encryption algorithm. The encryption algorithm and the decryption algorithm are usually set correspondingly. If the encryption algorithm is determined, then the decryption algorithm is determined. There is usually a correspondence between the indexes. In the present example, the mobile communication terminal A and the mobile communication terminal B read the encryption algorithm and the index of the encryption algorithm from the NFC security label cards storing the same content, or retrieve the decryption algorithm according to the index of the encryption algorithm;

an encrypting/decryption module, which is arranged to encrypt the data packet to be transmitted with the encryption algorithm read from the NFC security label card, so as to generate the encrypted data packet, and decrypt the encrypted data packet according to the decryption algorithm retrieved from the NFC security label card;

a communication module, which is arranged to communicate with other mobile communication terminals, including receiving and sending a short message and performing voice communication. In the present example, the communication module is configured to receive and send the encrypted data packet.

Example 2

Figure 10:
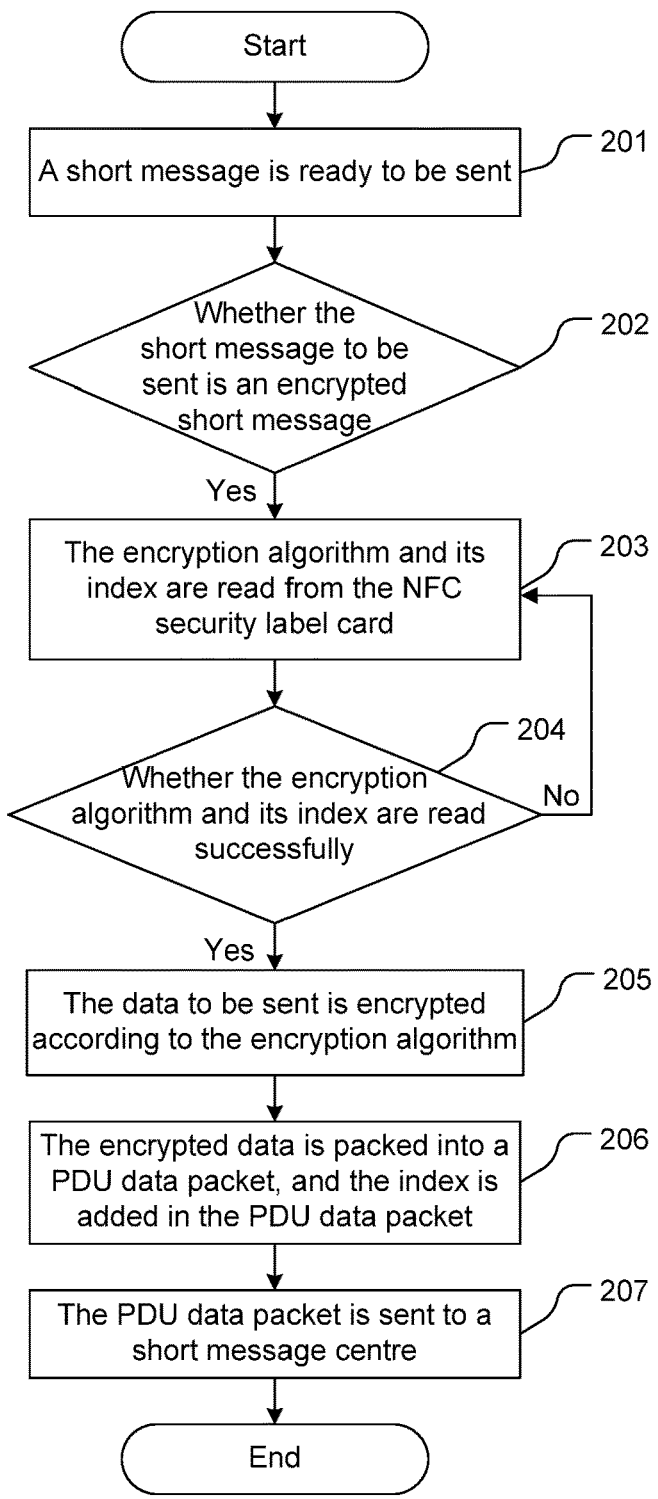
FIG. 10 shows encrypted communication method 1 according to an example of the disclosure.

As shown in FIG. 10, the present example provides an encrypted communication method, which includes the following steps.

In step S201: a short message is ready to be sent.

In step S202, it is determined whether the short message to be sent is an encrypted short message. If the short message to be sent is an encrypted short message; the process proceeds to S202; or else, the process proceeds to the conventional process of sending a short message.

In step S203, the decryption algorithm and its index are read from the NFC security label card.

In step S204, it is determined whether the decryption algorithm and its index are read successfully. If the decryption algorithm and its index are read successfully, the process proceeds to S204; or else, the process returns to S203.

In step S205, the data to be sent is encrypted according to the encryption algorithm. The data to be transmitted is content of the short message to be sent. In the specific implementation, if the number of times of reading repeatedly is greater than M, the reading is made no longer, wherein the M is an integer not less than 2.

In step S206, the encrypted data is packed into a Protocol Data Unit (PDU) data packet, and the index is added in the PDU data packet.

In step S207, the PDU data packet is sent to a short message centre; and the short message centre forwards the PDU data packet to the target communication terminal.

Example 3

Figure 11:
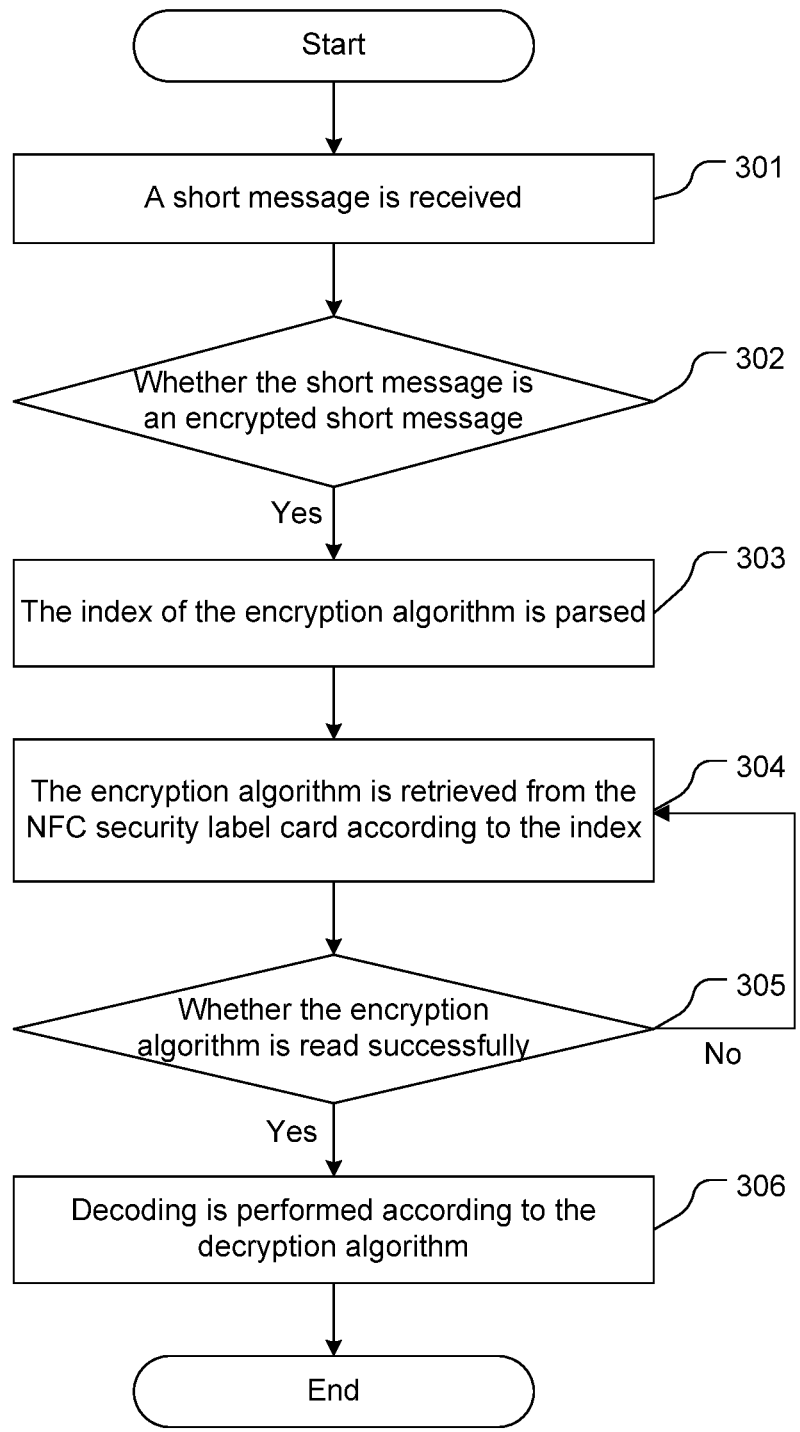
FIG. 11 shows encrypted communication method 2 according to an example of the disclosure.

As shown in FIG. 11, the example provides an encrypted communication method, which includes the following steps.

In step S301, a short message is received.

In step S302, it is determined whether the short message is an encrypted short message. If the short message is not an encrypted short message, the short message is parsed according to the existing method. If the short message is an encrypted short message, step S303 is performed. In the step 302, it is determined whether the received short message is an encrypted short message.

In step S303, the index of the encryption algorithm is parsed.

In step S304, the encryption algorithm is retrieved from the NFC security label card according to the index.

In step S305, it is determined whether the encryption algorithm is read successfully; if the encryption algorithm is not read successfully, the process returns to the step S304; or else, the process proceeds to the step S306.

In the step S306, decoding is performed according to the decryption algorithm.

Example 4

Figure 12:
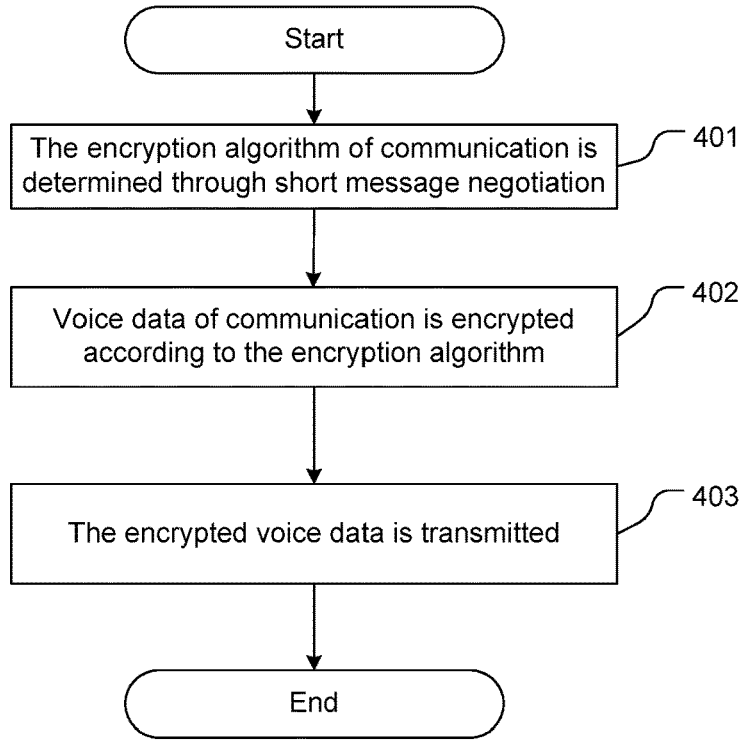
FIG. 12 shows encrypted communication method 3 according to an example of the disclosure.

As shown in FIG. 12, the example provides an encrypted communication method, which includes the following steps.

In step S401, an encryption algorithm of communication is determined through short message negotiation.

In step S402, voice data of communication is encrypted according to the encryption algorithm.

In step S403, the encrypted voice data is transmitted.

Example 5

Figure 13:
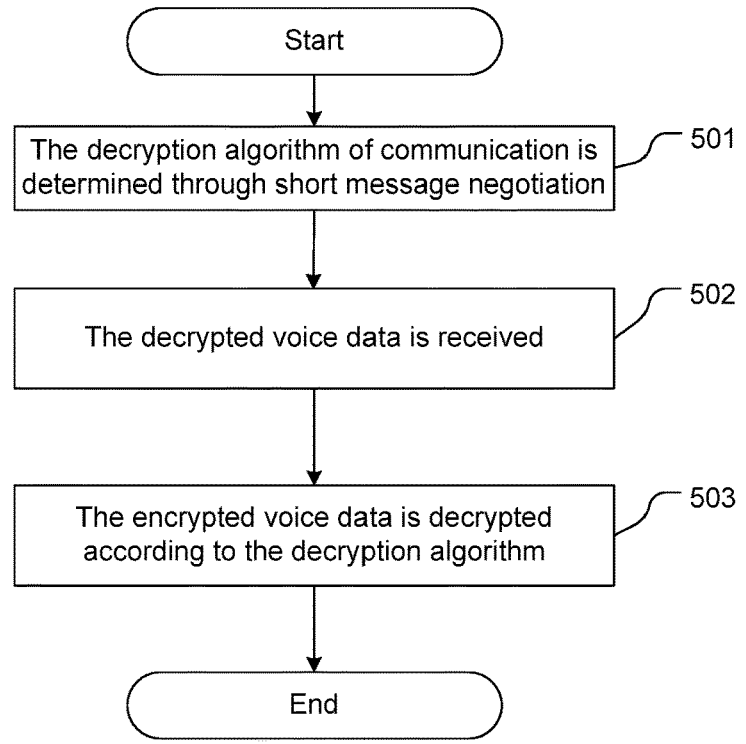
FIG. 13 shows encrypted communication method 4 according to an example of the disclosure.

As shown in FIG. 13, the example provides an encrypted communication method, which includes the following steps.

In step S501, a decryption algorithm of communication is determined through short message negotiation.

In step S502, an encrypted voice data is received.

In step S503, the encrypted voice data is decrypted according to the decryption algorithm.

In example 4 and example 5, it is only needed to determine the index of the encryption algorithm when the encryption algorithm and the decryption algorithm are negotiated.

The embodiment of the disclosure also provides a computer storage medium, in which computer executable instructions are stored. The computer executable instructions are arranged to perform at least one of the methods described in the embodiments or the examples, for example, the methods shown in FIG. 1 to FIG. 4.

The computer storage medium may include a mobile storage device, a Read-Only Memory (ROM), a Random Access Memory (RAM), a magnetic disc or a compact disc, and other media which can store program codes. In some embodiments, the storage medium can be a non-transient storage medium.

Those skilled in the art should understand that the embodiments of the disclosure can be provided as a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions designated in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions designated in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions designated in one or more flows of the flowcharts and/or one or more blocks of the block diagrams.

The above is only the preferred embodiments of the disclosure and not intended to limit the scope of protection of the disclosure.

What is claimed is:

1. An encrypted communication method, comprising:
reading, by a source communication terminal, an encryption algorithm and an index of the encryption algorithm from a first Near Field Communication (NFC) security label card;
encrypting, by the source communication terminal, a data packet to be transmitted with the encryption algorithm to generate an encrypted data packet;
sending, by the source communication terminal the encrypted data packet to a target communication terminal; and
sending, by the source communication terminal, the index to the target communication terminal;
wherein the index is used by the target communication terminal to obtain the encryption algorithm, to retrieve a decryption algorithm from a second NFC security label card according to the index, and to decrypt the encrypted data packet according to the decryption algorithm to obtain a decrypted data packet;
the encrypted data packet comprises an encrypted part and an unencrypted part;
the method further comprises:
adding an encryption label to the unencrypted part;
wherein the encryption label is arranged to indicate that the data packet where the label locates is the encrypted data packet, when the encrypted data packet comprises the encryption label, the encryption label indicates that the data packet is the encrypted data packet.

2. The method according to claim 1, wherein
the index is carried in the unencrypted part;
sending the index comprises:
carrying the index in the encrypted data packet to be sent along with the data packet.

3. The method according to claim 1, wherein
sending the index comprises:
sending the index through a negotiation data packet;
the negotiation data packet is a data packet which is used by the source communication terminal to send the index to the target communication terminal.

4. The method according to claim 3, wherein
sending the negotiation data packet to the target communication terminal through a short message communication link or a voice communication link when the source communication terminal performs voice communication with the target communication terminal.

5. An encrypted communication method, comprising:
receiving, by a target communication terminal, an index of an encryption algorithm from a source communication terminal;
receiving, by the target communication terminal, an encrypted data packet from a source communication terminal;
retrieving, by the target communication terminal, a decryption algorithm from a second Near Field Communication (NFC) security label card according to the index; and
decrypting, by the target communication terminal, the encrypted data packet according to the decryption algorithm to obtain the decrypted data packet;
the encrypted data packet comprises an encrypted part and an unencrypted part;
the unencrypted part also comprises an encryption label;
the method further comprises:
parsing the unencrypted part of the received data packet to determine whether the encrypted data packet comprises the encryption label; and
determining, when the encrypted data packet comprises the encryption label, that the data packet is the encrypted data packet, and proceeding to the step of retrieving the decryption algorithm from the second NFC security label card according to the index.

6. The method according to claim 5, wherein
the index is carried in the encrypted data packet to be received along with the encrypted data packet.

7. The method according to claim 5, wherein
receiving the index of the encryption algorithm comprises:
receiving a negotiation data packet;
wherein the negotiation data packet is a data packet which is used by the source communication terminal to send the index to the target communication terminal.

8. The method according to claim 7, wherein
when the source communication terminal performs voice communication with the target communication terminal, receiving the negotiation data packet comprises:
receiving the negotiation data packet through a short message communication link or a voice communication link.

9. A source communication terminal, comprising hardware configured to execute instructions stored in a non-transitory computer readable medium to perform the following units:
a reading unit arranged to read an encryption algorithm and an index of the encryption algorithm from a first Near Field Communication (NFC) security label card;
an encrypting unit arranged to encrypt a data packet to be transmitted with the encryption algorithm to generate an encrypted data packet;
a sending unit arranged to send the encrypted data packet to a target communication terminal; and
the sending unit is further arranged to send the index to the target communication terminal;
wherein the index is used by the target communication terminal, to retrieve a decryption algorithm from a second NFC security label card according to the index, and to obtain the encryption algorithm to decrypt the encrypted data packet according to the decryption algorithm to obtain a decrypted data packet;
the encrypted data packet comprises an encrypted part and an unencrypted part;
the hardware is also configured to execute instructions stored in a non-transitory computer readable medium to perform the following unit:
an adding unit arranged to add an encryption label to the unencrypted part;
wherein the encryption label is used to indicate that the data packet where the label locates is the encrypted data packet, when the encrypted data packet comprises the encryption label, the encryption label indicates that the data packet is the encrypted data packet.

10. The terminal according to claim 9, wherein
the index is carried in the unencrypted part;
the sending unit is arranged to carry the index in the encrypted data packet to send the index along with the data packet.

11. The terminal according to claim 9, wherein
the sending unit is arranged to send the index through a negotiation data packet;
the negotiation data packet is a data packet which is used by a source communication terminal to send the index to a target communication terminal.

12. The terminal according to claim 11, wherein
the sending unit is arranged to send, when the source communication terminal performs voice communication with the target communication terminal, the negotiation data packet to the target communication terminal through a short message communication link or a voice communication link.

13. A target communication terminal, comprising hardware configured to execute instructions stored in a non-transitory computer readable medium to perform the following units:
a receiving unit arranged to receive an index of an encryption algorithm from a source communication terminal; the receiving unit is further arranged to receive an encrypted data packet from the source communication terminal;
a retrieving unit arranged to retrieve a decryption algorithm from a second Near Field Communication (NFC) security label card according to the index; and
a decrypting unit arranged to decrypt the encrypted data packet according to the decryption algorithm to obtain the decrypted data packet;
wherein the encrypted data packet comprises an encrypted part and an unencrypted part;
the unencrypted part also comprises an encryption label;
the hardware also configured to execute instructions stored in a non-transitory computer readable medium to perform the following units:
a parsing unit arranged to parse the unencrypted part of the received data packet to determine whether the encrypted data packet comprises the encryption label; and
a determining unit arranged to determine, when the encrypted data packet comprises the encryption label, that the data packet is the encrypted data packet; and
the retrieving unit arranged to retrieve, when it is determined that the received data packet is the encrypted data packet, the decryption algorithm from the second NFC security label card according to the index.

14. The terminal according to claim 13, wherein
the receiving unit is arranged to receive the index carried in the encrypted data packet along with the encrypted data packet.

15. The terminal according to claim 13, wherein
the receiving unit is arranged to receive a negotiation data packet;
wherein the negotiation data packet is a data packet which is used by the source communication terminal to send the index to the target communication terminal.

16. The terminal according to claim 15, wherein
the receiving unit is arranged to receive, when the source communication terminal performs voice communication with the target communication terminal, the negotiation data packet through a short message communication link or a voice communication link.

* * * * *